Nov. 25, 1947.　　　R. A. GOEPFRICH　　　2,431,551
SUPPORT CONSTRUCTION FOR HYDRAULIC BRAKE WHEEL CYLINDERS
Filed Nov. 15, 1944　　　2 Sheets-Sheet 1
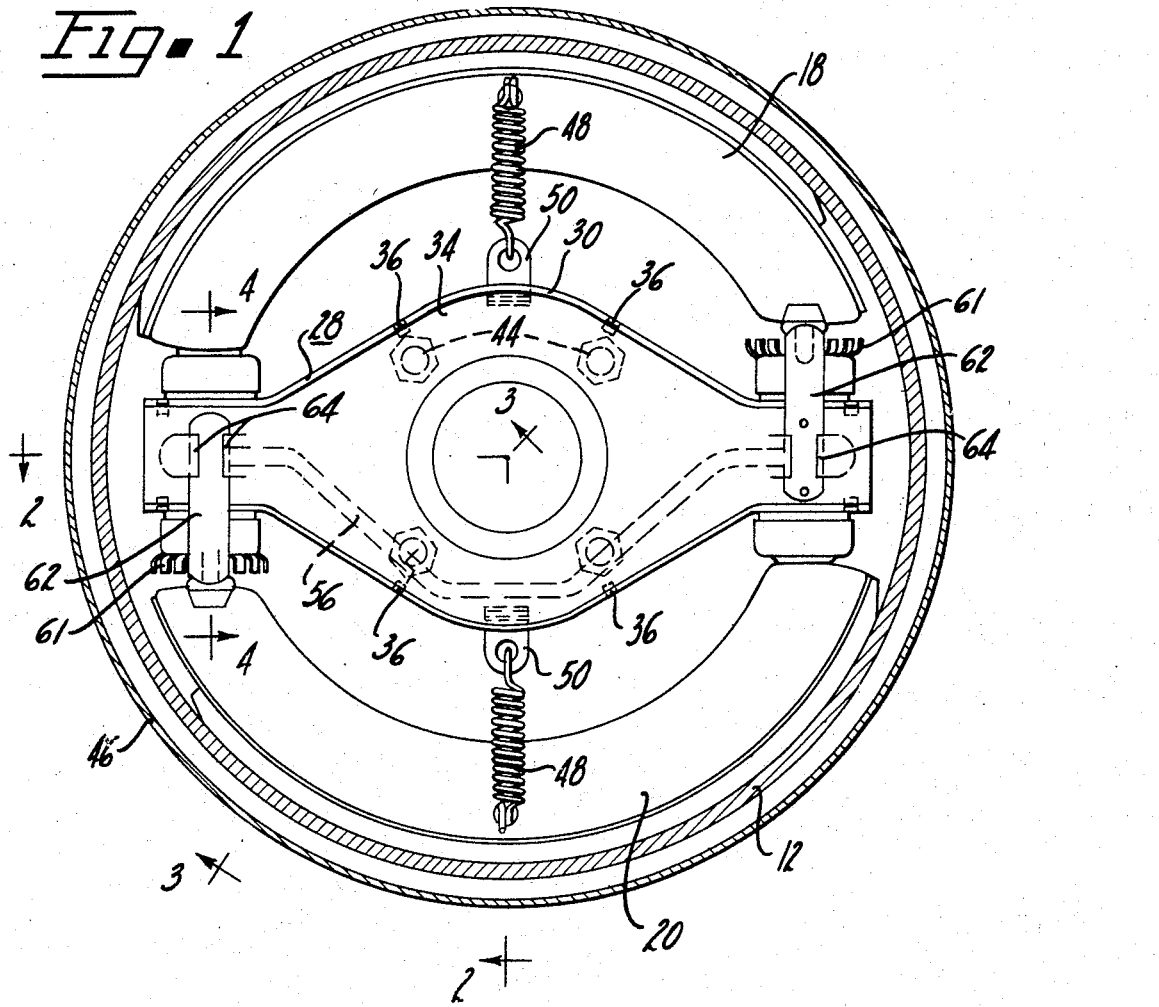
INVENTOR.
RUDOLPH A. GOEPFRICH
BY
T. J. Plante Nov. 25, 1947.　　　R. A. GOEPFRICH　　　2,431,551
SUPPORT CONSTRUCTION FOR HYDRAULIC BRAKE WHEEL CYLINDERS
Filed Nov. 15, 1944　　　2 Sheets-Sheet 2

INVENTOR.
RUDOLPH A. GOEPFRICH
BY

Patented Nov. 25, 1947

2,431,551

UNITED STATES PATENT OFFICE 2,431,551

SUPPORT CONSTRUCTION FOR HYDRAULIC BRAKE WHEEL CYLINDERS

Rudolph A. Goepfrich, South Bend, Ind., assignor to Bendix Aviation Corporation, South Bend, Ind., a corporation of Delaware Application November 15, 1944, Serial No. 563,475

9 Claims. (Cl. 188—152)

This invention relates to brake construction.

The principal object of the invention is to provide a simplified brake structure, which will nevertheless be very efficient in operation and will possess adequate strength.

Figure 3:
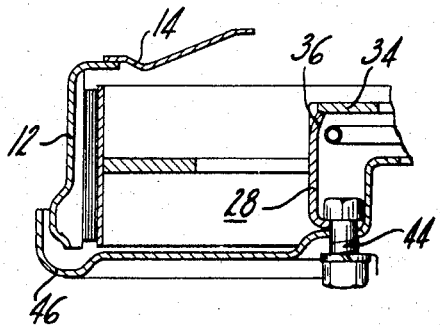
Figure 2:
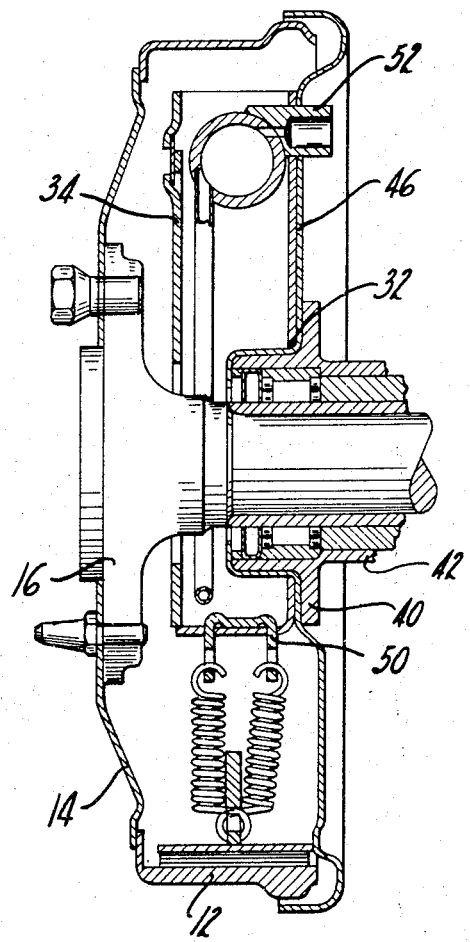
Figure 4:
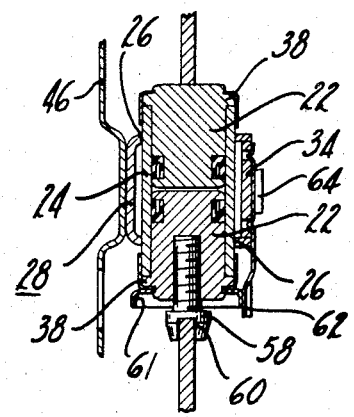

Other objects and advantages of the invention will become apparent during the course of the following description, reference being had therein to the accompanying drawings, in which:

Figure 1 is a side elevation showing the various brake parts in assembled relation; and Figures 2, 3 and 4 are sections taken on the lines 2—2, 3—3 and 4—4 respectively of Figure 1.

Referring to the drawings, the cylindrical braking flange 12 of a brake drum 14, which is secured to a rotating axle 16, is adapted to be slowed or stopped by means of the usual brake shoes 18 and 20. The brake shoes are adapted to be moved into contact with the drum by means of hydraulically actuated pistons 22, shown in section in Figure 4. In the illustration, an applying piston is provided at each end of each shoe, but this particular arrangement is not directly associated with the present invention, and is only intended to show a possible type of brake actuation.

Practically all conventional wheel cylinders are formed by casting and subsequently machining the cast structure, which is quite expensive and time consuming. I propose to vastly simplify the construction of wheel cylinders by utilizing tubing cut to the desired length and supported by suitable means in the brake assembly. Referring particularly to Figure 4, the pistons 22 are reciprocable in a tube 24 which extends through alined openings 26 formed in opposite sides of a channel section member 28. The tube 24 is preferably welded (the term "welded" includes hydrogen brazing, the most likely process) to each of the side walls of the channel section member 28. The conformation of the member 28 is such that it may be formed by a drawing process.

As seen in Figures 1 and 2, the channel section member 28 is widened out considerably at the center of the brake assembly, as indicated at 30, and is provided with an opening 32 for the axle 16 and the axle housing 42.

In order to give added strength to the channel section support member 28, a stamped plate 34 is fitted into the open side of the member 28, thereby completing a box section. Said stamped plate 34 is preferably hydrogen brazed to the walls of the channel section member 28. A plurality of sheared nibs 36 (see Figs. 1 and 3) in the side walls of the channel section member 28 may be utilized to maintain the plate 34 in the proper position during the brazing operation.

Since it is intended that the anchoring torque of the shoes 18 and 20 be transmitted to a fixed part of the vehicle through the tubes 24 and the box section support member comprising members 28 and 34, it is important that the structure be sufficiently strong to withstand the torque. For this reason the box section spider or torque member is utilized, and the tubes 24 are welded to both sides of said box section spider at the edges of the openings 26. In the illustration, the anchoring torque of the shoes is transmitted to the tubes 24 by means of flanges 38 formed on the pistons 22.

The rear wall of channel section member 28 is secured to a fixed part of the vehicle such as the flange 40 on axle housing 42 by means of a plurality of bolts 44. A cover plate 46 may also be secured to the mounting flange 40 by means of the same bolts, the cover plate serving to substantially enclose the drum and thereby keep out dust and dirt from the brake assembly.

A plurality of return springs 48 are provided for normally holding the shoes away from the drum, and for returning the shoes to released position after each brake application. The springs 48 may be arranged in pairs which (as shown in Figure 3) are hooked at one end to the arms of a U-shaped stamping 50 and at the other end to the web of the respective shoe.

An inlet fitting 52 is provided for the tube 24 shown at the left side of Figure 1, while a bleeder fitting is provided for the tube 24 shown at the right side of Figure 1. The two tubes 24 are interconnected by a conduit 56. Preferably the conduit 56 and the inlet and bleeder fittings are brazed to the cylinder tubes at the same time that the cylinder tubes and plate 34 are brazed to the side walls of the channel section member 28. It is both desirable and necessary to secure the fittings to the cylinder tubes by welding, since the wall section of the tubes is not sufficiently thick to provide a threaded opening.

Adjusting means are provided for the shoes consisting of screws 58 threaded into two of the pistons 22 and having slots 60 to engage the shoe webs, and serrated stampings 61 secured to the pistons and adapted to be rotated to rotate the pistons and thereby cause relative longitudinal movement between the pistons and the adjusting screws. A pawl 62 held in position by ears 64 on plate 34 may be arranged to maintain each serrated head 60 in the selected position.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake structure for a vehicle comprising a box-section support member having one wall thereof secured to a fixed part of the vehicle, and a hydraulic cylinder constituted by a tube welded to said support member.

2. A brake structure for a vehicle comprising a box-section support member having one wall thereof secured to a fixed part of the vehicle, and a hydraulic cylinder constituted by a tube welded to said support member, the hydraulic cylinder being welded to the sides of the support member which extend transversely of the cylinder axis.

3. A brake structure comprising a channel-section stamping secured to a fixed part of the vehicle and having alined openings through the channel sides near one end of the stamping, a tube extending through said openings and welded to the stamping at the edges of the openings, and a plate fitting into the open side of the channel-section stamping and held in position by internal projections on the side walls of said stamping.

4. A brake structure comprising a channel section spider secured to a fixed part of the vehicle and having alined openings through the channel sides near one end of the spider, a tube extending through said openings and welded to the spider at the edges of the openings, and a plate fitting into the open side of the channel-section spider and held in position by internal projections on the side walls of said spider.

5. A brake structure comprising a channel-section spider having alined openings through the channel sides near one end of the spider, a tube extending through said openings and welded to the spider at the edges of the openings, and a plate fitting into the open side of the channel-section spider.

6. A brake structure comprising a spider having a channel-shaped cross-section throughout its length and having alined openings through the channel sides near one end of the spider, and a tube extending through said openings and welded to the spider at the edges of the openings.

7. A brake structure for a vehicle comprising a spider secured to a fixed part of the vehicle, a hydraulic cylinder constituted by a tube welded directly to said support member, said tube having two openings through the wall thereof, a hollow fitting welded to the tube with its interior in communication with the interior of the tube through one of said openings, and a conduit welded to the tube with its interior in communication with the interior of the tube through the other of said openings.

8. A brake structure comprising a channel-section spider having, near each end thereof, a pair of aligned openings through the sides of the channel, and two hydraulic cylinders supported by the spider, each of said cylinders extending through the pair of aligned openings provided at one end of the spider.

9. A brake structure comprising a channel-section spider having, near each end thereof, a pair of aligned openings through the sides of the channel, two hydraulic cylinders supported by the spider, each of said cylinders extending through the pair of aligned openings provided at one end of the spider, and a plate fitting into the open side of the channel-section spider to provide a box-shaped cross-section.

RUDOLPH A. GOEPFRICH.

REFERENCES CITED

The following references are of record in the file of this patent:

UNITED STATES PATENTS

| Number | Name | Date |
|---|---|---|
| 2,050,681 | White | Aug. 11, 1936 |
| 2,312,224 | Weatherhead | Feb. 23, 1943 |
| 2,245,682 | Kerr | June 17, 1941 |